United States Patent Office 3,300,319
Patented Jan. 24, 1967

3,300,319
SOLID SAUCE BASES
Nicholas G. Marotta, Milltown, and Kenneth S. Ronai, Ridgewood, N.J., assignors to National Starch and Chemical Corporation, New York, N.Y., a corporation of Delaware
No Drawing. Filed Dec. 26, 1963, Ser. No. 333,618
2 Claims. (Cl. 99—144)

This invention relates to novel sauce bases and to a method for preparing the same.

Sauces used to enhance the flavor characteristics of frozen vegetables, canned foods, and the like, usually contain varying amounts of starches or starch derivatives which serve as thickeners, fillers, or emulsion stabilizers. In addition, such sauces often contain some type of fat or oil in order to provide added flavor. However, the inclusion of fats or oils in the sauces creates a number of problems. Thus, fats often impart a greasy feel or turbid appearance to the sauce which, in addition to being unsightly, also creates various packaging difficulties. Moreover, since fats and oils are not always compatible with many of the dry ingredients commonly used to prepare sauces, it is often extremely difficult to prepare a sauce having a smooth, uniform consistency. Lastly, sauces containing a mixture of starch products and fats or oils usually possess an undesirably high viscosity which again presents handling and packaging problems.

It is an object of this invention to prepare sauce bases capable of yielding sauces which enhance to a remarkable degree the taste and appearance of the foods to which said sauces are added. A further object of this invention is to prepare dry sauce bases which are readily prepared, easily handled, and quickly converted into sauces. Other objects and advantages of this invention will be apparent from the discussion that follows hereinafter.

In accordance with the invention, starch conversion products having certain critical viscosity and solubility characteristics, hereinafter defined, are intimately admixed with a suitable edible lipid so as to yield mixtures having a dough-like consistency. On mixing with water, these mixtures provide sauces which are found, surprisingly, to impart unusually desirable features of taste, color, and appearance to the foods with which they are admixed.

For the purposes of this invention, the term "starch conversion product" includes starch conversion products selected from the group consisting of dextrins and oxidized starches, both of the latter groups of conversion products having certain viscosity and solubility characteristics as described hereinafter.

As is known in the art, dextrins are starch conversion products formed by the incomplete degradation of starch as a result of the action of heat on raw or acidified dry starch. As for oxidized starches, these are starch conversion products prepared by the reaction of sodium hypochlorite with an aqueous suspension of raw starch.

We have found that optimum results are achieved in preparing the novel sauce bases of our invention when the dextrins which are utilized have a viscosity of from about 2,500 to about 60,000 centipoises. Within the latter range, outstanding results are obtained using dextrins having a viscosity of from about 7,000 to 24,000 centipoises.

The method for measuring the viscosity of the dextrins described herein is based upon a determination of the viscosity of their cooked aqueous dispersions. In this procedure, an aqueous dispersion of the dextrin having a solids content of 55%, by weight, is cooked for 5 minutes at 195° F. The cook is then adjusted to the latter solids content and cooled to 100° F., whereupon its viscosity is immediately measured by the use of a suitable viscometer.

In addition to the viscosity values set forth hereinabove, the dextrins employed in preparing the sauce bases of this invention must have a solubility in water such that when one part of the dextrin is suspended in 99 parts of water, at 72° F., said dextrin will dissolve to an extent of from about 50 to 100%, by weight. Within this range, we prefer to employ dextrins having a solubility of from 70 to 100%.

When oxidized starches are employed in the preparation of our novel sauce bases, optimum results are obtained by the use of those oxidized starches which have a water fluidity value of at least 65. The water fluidity values of the oxidized starches used in the process of our invention are determined by means of the following procedure.

A sample of the oxidized starch which may vary in weight from about 7 to 15 grams is weighed out and placed, together with 100 cc. of water, into a 150 cc. copper beaker. With constant stirring, the aqueous slurry of the oxidized starch is then heated for 30 minutes in a water bath maintained at 100° C. At the end of the heating period, the sample is removed from the water bath and any water that may have evaporated from the slurry is replaced. After the sample has cooled to about 82° C., it is poured into the standard cup used in the Stormer Shear Viscometer, the temperature of the slurry being maintained at 82° C. Using a large paddle, the time required for 100 revolutions of the rotor is measured on the viscometer. The water fluidity value is then determined from a chart that calibrates viscosity in relation to the time required for 100 revolutions of the rotor, as based on the sample size used. Thus, the less time required, under these conditions, for 100 revolutions of the rotor, the lower will be the viscosity of the sample, as reflected, in turn, by a higher water fluidity value.

We have found that if a sauce base is prepared which includes a starch conversion product having a viscosity or solubility outside the limits previously set forth, the flavor and/or appearance of the sauce derived therefrom will be detrimentally affected.

The starch conversion products, i.e. the dextrins and oxidized starches, employed in preparing the sauce bases of this invention may be derived from any of the known starch types, such, for example, as corn, high amylose corn, sago, wheat, rice, sweet potato, sorghum, waxy sorghum, waxy maize, potato or tapioca starches. It is preferred, however, to employ starch conversion products derived from the tuber, root or root-type starches which include starches derived from tapioca, sago, potato, arrowroot, waxy maize, waxy sorghum, and other waxy grains. Although the starches derived from waxy grain sources are not actually root starches, they are ordinarily classed as root-type, since so many of their properties correspond to those of the true root starches.

The lipids which can be used to prepare the sauce bases of this invention may be selected from among the class of edible fats or fat-like materials which may be in the form of a liquid oil or a solid or semi-solid fat. Such edible lipids include, for example, lard, modified lard, hydrogenated cotton seed oil, coconut oil, peanut oil, corn oil, safflower oil, butter, margarine and the like or any desired combination of such oils, semi-solid or solid fats. Moreover, it may be noted that when the sauces derived from our sauce bases are to be utilized for the flavoring of vegetables, it is desirable to employ butter or a lipid which is butter-like in its taste, in their preparation.

The sauce bases of our invention should contain from about 25 to about 90%, by weight, of one of the starch conversion products previously described and from about 10% to about 75%, by weight, of one or more edible lipids. Where desired by the practitioner, various other ingredients, such as artificial flavors, food dyes, seasonings, and the like, can be added to our novel sauce bases in varying amounts.

The sauce bases of our invention are usually prepared by intimately blending a mixture of the starch conversion product and the lipid until a pliable, dough-like mass is obtained. The mixing means used to obtain this doughy consistency may be varied according to the particular needs of the practitioner. Since these doughy bases are easily cut, shaped, molded, or frozen, they can be used in a variety of culinary applications. It may be noted that where the resulting sauce base is to contain only from about 10 to 30%, by weight of an edible lipid, its preparation may include the addition to the mixture of some water in a concentration of from about 25 to 30% of the total weight of the mixture. The use of water, in this manner, is not an absolute necessity but is desirable in those cases where a dough-like consistency is sought for in the resulting sauce base since, ordinarily, the use of these lower concentrations of lipid yields sauce bases which have a more rigid structure.

The amount of the sauce base which may be added to a particular food product will be determined, of course, by the flavor and appearance characteristics sought by the practitioner. Thus we have found that adding about 10 parts, by weight, of our sauce base to each 100 parts of food product yields foods having unusually good characteristics of taste and appearance. The actual conversion of our sauce bases from their solid, dough-like consistency into the form of the semi-liquid, aqueous dispersions in which they are to be ultimately consumed may be accomplished by means of a number of different techniques. Thus, water may be admixed with the sauce base and the resulting dispersion cooked for from about 2 to 5 minutes at temperatures of from about 190 to 212° F. The thus prepared sauce may then be added to a previously cooked foodstuff. Alternatively, the foodstuff may be cooked, along with the sauce base and the requisite amount of water, by means of the procedure regularly utilized for its preparation. The amount of water to be used for the conversion of our saurce bases will vary depending upon the particular foodstuff with which it is to be admixed. We have found, however, that the use of from about 2 to 4 parts, by weight, of water per part, by weight, of sauce base will usually provide satisfactory results. It may also be noted that aqueous dispersions of our novel sauce bases may be packaged in pressurized containers together with an aerosol propellant so as to provide a convenient means of dispensing these products.

It can be seen, therefore, that the sauce bases of our invention possess a number of advantageous features. Since these bases are of a dry, doughy consistency, they are easily handled and are readily blended with any other dry ingredients which may be used in the preparation of various food products. Moreover, our sauce bases, when used in the preparation of frozen and canned vegetables, yield sauces which impart a remarkable gloss and sheen to these foods. Furthermore, when the lipid employed is butter or some other lipid which is butter-like in its flavor, the sauces derived from our sauce bases will be found to enhance the buttery flavor which is often desired upon the cooking of frozen or canned vegetables. The enhancement of this flavor is probably a result of the fact that the sauces derived from our novel bases have the optimum viscosity and surface tension characteristics which therefore enable such vegetables to be coated in the most efficient manner.

In the following examples which further illustrate the embodiment of our invention, all parts given are by weight unless otherwise noted.

Example I

This example illustrates the preparation of a number of the sauce bases representative of our invention, their subsequent use in the preparation of foods, as well as the superior properties imparted to the foods wherein the sauces derived from these bases were included.

The sauce base formulations listed below were prepared by using a wire whip to admix the starch conversion product with the edible lipid. The resulting mixture was thus blended until it became dough-like in consistency.

The viscosities of the various dextrins employed in the preparation of these bases were determined by a procedure wherein a 55%, by weight, solids aqueous dispersion of the dextrin was cooked for 5 minutes at 195° F. The cook was then adjusted to the latter solids content and cooled to 100° F. whereupon the viscosity was immediately measured by means of a Brookfield Viscometer (at a spindle speed of 10 r.p.m.). The water fluidity values of the oxidized starches employed were determined by means of the procedure described earlier in this specification.

The solubility of each dextrin employed in these examples was determined with a 1%, by weight, aqueous suspension of the dextrin at 72° F.

Formulation #1: Parts
    Dextrin (viscosity=22,000 centipoises;
      solubility=92%; starch base=tapioca) ___ 60
    Butter _____ 40
Formulation #2:
    Dextrin (viscosity=22,000 centipoises;
      solubility=92%; starch base=waxy maize) __ 60
    Butter _____ 40
Formulation #3:
    Dextrin (viscosity=60,000 centipoises;
      solubility=50%; starch base=tapioca) ___ 40
    Butter _____ 60
Formulation #4:
    Dextrin (viscosity=2,500 centipoises;
      solubility=100%; starch base=tapioca) ___ 70
    Butter _____ 30
Formulation #5:
    Dextrin (viscosity=22,000 centipoises;
      solubility=92%; starch base=tapioca) ___ 60
    Oleomargarine _____ 40
Formulation #6:
    Oxidized waxy maize starch
      (Water fluidity=75) _____ 60
    Butter _____ 40
Formulation #7:
    Dextrin (viscosity=15,000 centipoises;
      solubility=60%; starch base=corn) _____ 60
    Butter _____ 40
Formulation #8:
    Dextrin (viscosity=30,000 centipoises;
      solubility=80%; starch base=tapioca) ___ 90
    Butter _____ 10
Formulation #9:
    Oxidized waxy maize starch
      (Water fluidity=68) _____ 60
    Butter _____ 40
Formulation #10:
    Dextrin (viscosity=15,000 centipoises;
      solubility=95%; starch base=tapioca) ___ 60
    Lard _____ 40
Formulation #11:
    Dextrin (viscosity=20,000 centipoises;
      solubility=85%; starch base=corn) _____ 60
    Cotton seed oil _____ 40
Formulation #12:
    Dextrin (viscosity=60,000 centipoises;
      solubility=50%; starch base=tapioca) ___ 25
    Butter _____ 75

A sample comprising 10 parts of each of the above described sauce base formulations was then added, respectively, to a cooking vessel containing 100 parts of frozen peas. Thereupon 40 parts of water were added to each of the resulting mixtures which were then cooked for about 10 minutes at a temperature of about 200° F. In all instances, the cooked peas exhibited excellent gloss and sheen while those peas which had been mixed with a butter-containing sauce base exhibited a highly desirable buttery flavor.

Example II

This example demonstrates the importance of employing only dextrins and oxidized starches in the preparation of our novel sauce base formulations and also indicates the criticallity of the designated viscosity and solubility characteristics required by the latter starch conversion products. This is accomplished by illustrating the poor results obtained when various starches which did not fulfill the necessary requirements were utilized for the preparation of sauce bases by means of the identical procedure described in Example I.

Below are listed the various starches which were used in preparing these formulations each of which contained 60 parts of the starch and 40 parts of butter. Also included is an evaluation of the appearance, and in one case the taste, of each of the sauces which were derived from these sauce bases.

| Starch utilized in sauce base | Evaluation of resulting sauce |
|---|---|
| Pregelatinized tapioca starch (viscosity=1,000 cps. @ 5.5% solids). | Highly viscous and turbid. |
| Pregelatinized corn starch (viscosity=800 cps. @ 5.5% solids). | Do. |
| Corn starch (converted by acid conversion to a degree known in the art as 9) fluidity). | Poor sheen and poor taste. |
| Corn starch (converted by acid conversion to a degree known in the art as 4) fluidity). | Highly viscous. |

Thus, it can be seen that the novel sauce bases of our invention must be prepared only with those designated starch conversion products having the requisite viscosity and solubility characteristics in order that they may be able to yield sauces displaying the desired combination of flavor and appearance.

Summarizing, the process of our invention is thus seen to provide the practitioner with improved sauce bases having a novel dough-like consistency and which are capable of yielding sauces displaying improved taste, color and appearance. Variations may be made in proportions, procedures and materials without departing from the scope of this invention which is limited only by the following claims.

We claim:

1. A solid sauce base composition comprising an edible lipid intimately admixed with a starch conversion product selected from the group consisting of dextrins and oxidized starches; wherein the viscosity of said dextrins is such that a 55%, by weight, aqueous dispersions of said dextrins will have a viscosity in the range of from 2,500 to 60,000 centipoises, as determined by means of the procedure described herein; wherein when one part of said dextrins is suspended in 99 parts of water, at 72° F., it will dissolve to an extent of from about 50 to 100% by weight; wherein said oxidized starches have a water fluidity value of at least 65, as determined by means of the procedure described herein; and, wherein said sauce base contains from about 25 to about 90%, by weight, of one of said starch conversion products and from 10 to about 75%, by weight, of an edible lipid.

2. A sauce for use in the flavoring of foodstuffs comprising an aqueous dispersion of a solid sauce base, the latter sauce base comprising an edible lipid intimately admixed with a starch conversion product selected from the group consisting of dextrins and oxidized starches; wherein the viscosity of said dextrins is such that a 55%, by weight, aqueous dispersion of said dextrins will have a viscosity in the range of from 2,500 to 60,000 centipoises, as determined by means of the procedure described herein; wherein when one part of said dextrins is suspended in 99 parts of water at 72° F., it will dissolve to an extent of from about 50 to 100% by weight; wherein said oxidized starches have a water fluidity value of at least 65, as determined by means of the procedure described herein; wherein said sauce base contains from about 25 to about 90%, by weight, of one of said conversion products and from 10 to about 75%, by weight, of an edible lipid; and wherein said sauce contains from about 2 to 4 parts, by weight, of water per part, by weight, of said solid sauce base.

References Cited by the Examiner

UNITED STATES PATENTS

| | | | |
|---|---|---|---|
| 2,131,064 | 9/1938 | Musher | 99—144 |
| 2,168,360 | 8/1939 | Musher | 99—144 X |
| 2,203,643 | 6/1940 | Musher | 99—144 |
| 2,653,876 | 9/1953 | Hanson et al. | 99—139 X |
| 2,755,190 | 7/1956 | Oyler | 99—139 X |
| 2,909,431 | 10/1959 | Keller | 99—139 X |
| 2,941,889 | 6/1960 | Welch | 99—186 |
| 3,093,485 | 6/1963 | Partyka | 99—144 |
| 3,093,486 | 6/1963 | Krett et al. | 99—144 |

OTHER REFERENCES

Sair et al.: "Water Sorption by Cornstarch and Commercial Modification of Starches," Industrial and Engineering Chemistry, April 1944, pp. 316–317.

Whistler et al.: "Industrial Gums," 1959, Academic Press, New York, pp. 695–696.

A. LOUIS MONACELL, *Primary Examiner.*

JOSEPH M. GOLIAN, J. M. HUNTER, *Examiners.*